United States Patent [19]

Pirnie, III

[11] 3,924,071

[45] Dec. 2, 1975

[54] AREA UNIT STATUS SYSTEM

[75] Inventor: Robert M. Pirnie, III, Montgomery, Ala.

[73] Assignee: Communication Equipment and Contracting Company, Inc., Union Springs, Ala.

[22] Filed: Oct. 16, 1973

[21] Appl. No.: 403,256

Related U.S. Application Data

[63] Continuation-in-part of Ser. No. 334,980, Feb. 23, 1973, Pat. No. 3,854,009.

[52] U.S. Cl. .......... 179/2 A; 340/81 R

[51] Int. Cl.[2] .......... H04M 11/02

[58] Field of Search .......... 179/2 A, 2 R, 81 C, 84 C, 179/84 L, 18 B; 340/81 R, 83, 334

[56] References Cited

UNITED STATES PATENTS

| | | | |
|---|---|---|---|
| 2,884,491 | 4/1959 | Breen | 179/84 L |
| 3,271,524 | 9/1966 | Allen et al. | 179/27 CA |
| 3,391,304 | 7/1968 | Fabry | 340/83 |
| 3,567,868 | 3/1971 | Mukae et al. | 179/81 C |
| 3,614,325 | 10/1971 | Galian et al. | 179/2 R |
| 3,743,792 | 7/1973 | Duff et al. | 179/84 C |

*Primary Examiner*—Kathleen H. Claffy
*Assistant Examiner*—Tommy P. Chin
*Attorney, Agent, or Firm*—Wilkinson, Mawhinney & Theibault

[57] ABSTRACT

A system for ascertaining the service status of area units such as motel rooms by establishing various flashing rates to represent three different lamp indicating conditions among each lamp through visual lighted panels at the front desk-housekeeper's desk, and maid area which panels are controlled by positive sequential actuation of the telephone dialing or touch tone units on the telephone of each room.

2 Claims, 3 Drawing Figures

AREA UNIT STATUS SYSTEM

This is a continuation-in-part application of my prior application Ser. No. 334,980, filed Feb. 23, 1973, entitled AREA UNIT STATUS SYSTEM, now U.S. Pat. No. 2,854,009.

The present system is directed to showing the status, out of service, in process of service, or ready for use, of multiple areas in a hotel, motel, hospital or marina in which each unit of the entire composite has at least one telephone having either a conventional dial or touch tone signalling system associated therewith and which telephones are adapted to be selectively placed in circuit with or removed from circuit with incoming trunk lines.

The prior art as exemplified by U.S. Pat. No. 3,614,325 deals with a telephone and signalling system in which the hook switch actuates a signalling system to indicate room status and which relied upon the maid taking the phone off hook which cauuses the indicating means to shift from the first to the second condition and remain there as long as the telephone is off hook and in which she replaces the telephone receiver on hook causing the indicating means to shift to the third condition.

The present invention does not depend on mere on hook-off hook to give a status of room or space condition. The front desk upon a customer checking out actuates a switch which disconnects the telephone from the incoming trunk lines and illuminates a red light on the housekeepers or supervisory information panel and maids or remote visual repeater in a sector of the entire area showing specifically where service is required. The maid upon entering the room to be serviced takes the phone off hook and dials or pulses the unit 4 which causes the green light at the front desk and housekeepers panel to light indicating that the room is being made up. Upon completion of the servicing of the room the maid takes the phone off hook and dials or pulses 0 which de-energizes the red light at the front desk and housekeepers supervisory information panel showing by a green light at all three stations that the room is ready for re-renting. The entire system including outside communication between telephones and trunk lines is reactivated by operation of a clearing switch at the front desk or service area control means. This system eliminates false signals such as may be had in the prior art should a customer return to the room and place the receiver on hook before the maid had completed service.

Another common false signal of prior systems occurs when a customer returns to the room after check out and attempts to use the phone which causes a false indication upon his placing the phone on hook that the room has been serviced when in point of fact the maid may not have entered the room.

The invention of the subject continuation-in-part resides in accomplishing the foregoing, with improved signalling, utilizing only a single lamp at each station for signalling all conditions with attendant savings in cost of circuitry. It operates in a steady-state condition and in flashing and winking modes.

With the foregoing and other objects in view the invention will be more fully described hereinafter and more particularly pointed out in the appended claims.

In the drawings in which like parts are denoted by reference characters throughout the several views:

FIG. 2 is a schematic of the block diagram of FIG. 1 illustrating only a single room card whereas FIG. 1 shows multiple room cards and telephones.

Figure 1:
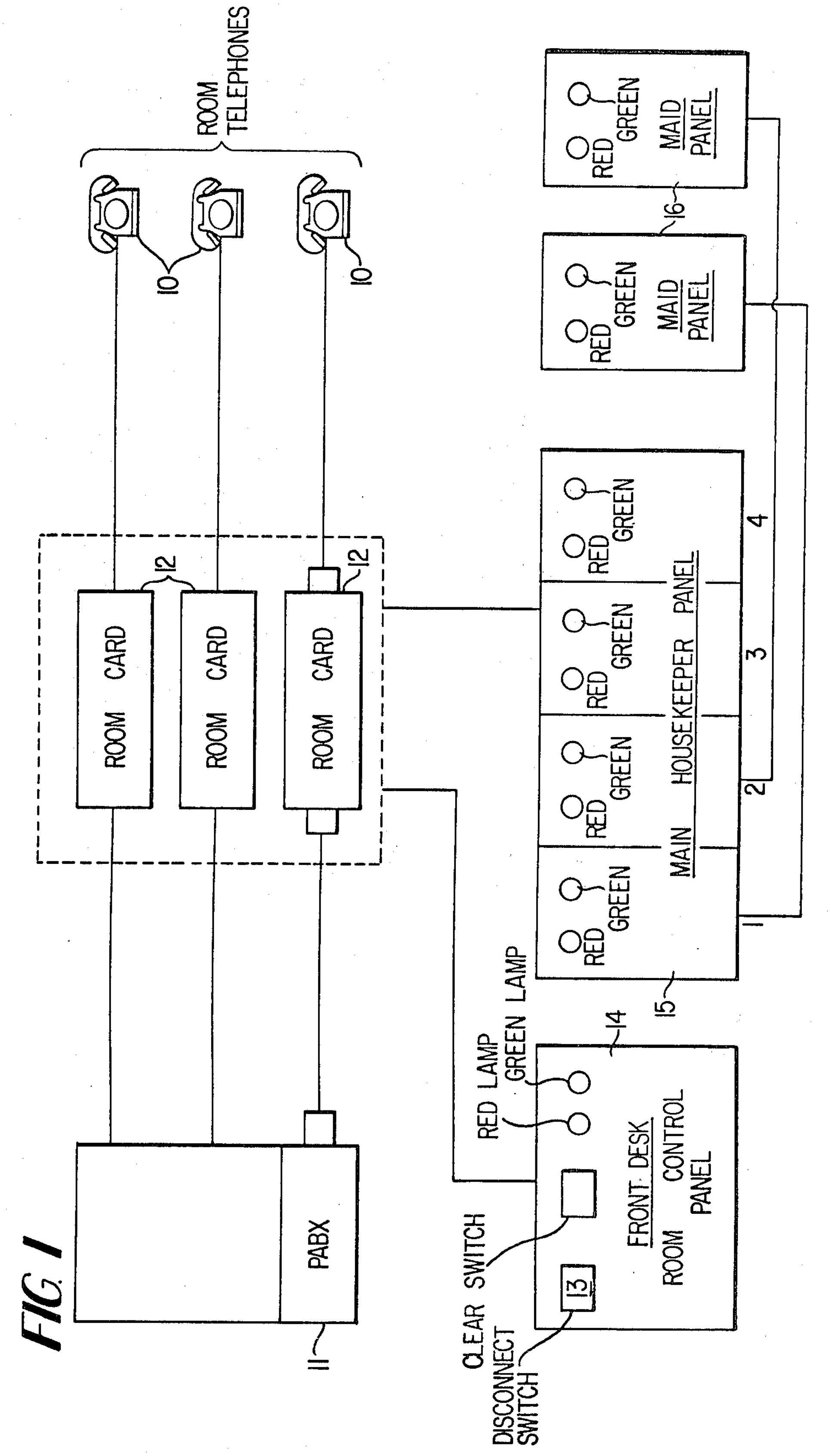
FIG. 1 is a block diagram of a system in accordance with the invention of said patent.

Referring now to FIG. 1 which shows the system of the patented invention applicable to a motel or hotel in which each rental unit or room has at least one telephone 10 connectable to incoming PABX trunk lines 11, through a room card 12 which is controlled by a switch 13. A front desk control panel or service area control means 14 is in circuit with the room card 12 and housekeepers or supervisory information visual condition indicating means 15. In parallel with the housekeepers unit 15 is a remote repeater panel 16, both 15 and 16 being in parallel with the front desk control unit 14 indicating means.

Figure 2:
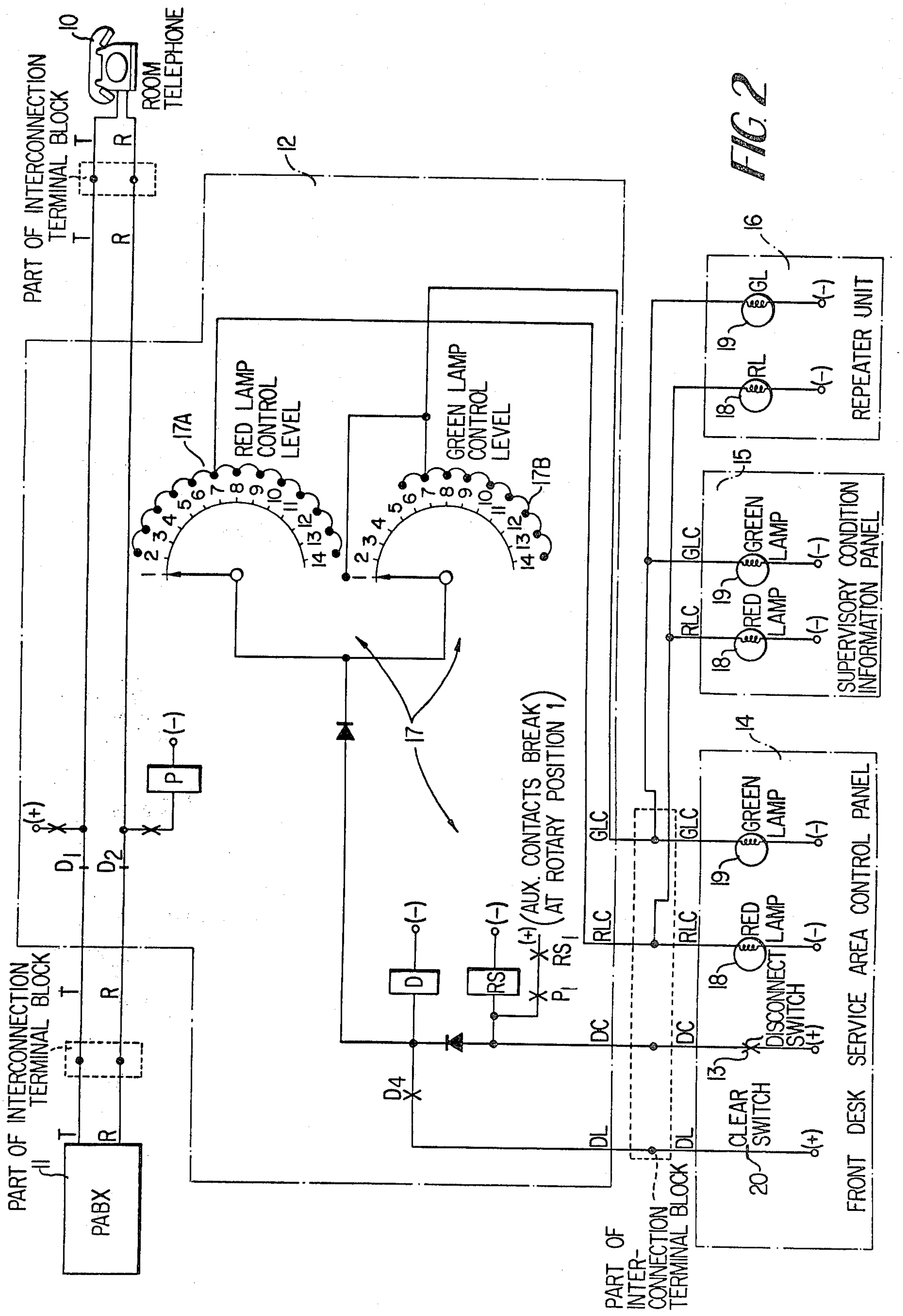

Referring now to FIG. 2 upon a customer checking out at the front desk or service area control means 14, the clerk actuates the disconnect switch 13 which disconnects the telephone 10 from the incoming trunk line 11 through relay D, via its $D_1$ and $D_2$ contacts in trunk lines T and R, while simultaneously connecting the telephone 10 into the inhouse circuit through the room card 12 which is a printed circuit card, one for each room. This simultaneously steps the rotary switch 17 on card 12 one step because its relay RS is also actuated by disconnect switch 13. The switch 17 has two levels 17A and 17B in which 17A controls all red lamps 18 while level 17B controls all green lamps 19. All red lamps 18 are now illuminated, and all green lamps are off.

At this point the maid enters the room and takes phone 10 off hook and dials or pulses the number 4 which operates the relay P which steps rotary switch 17 to position 6 as a result of operating $P_1$, contacts which illuminates all green lamps 19 while simultaneously maintaining all red lamps 18 illuminated. She then hangs up the phone and services the room.

Upon completion of servicing the room the maid then picks up phone 10 and dials 0 which operates relay P and steps rotary switch 17 to position 1 which cuts off all red lights 18 leaving only green lights 19 illuminated indicating that the room has been serviced. She then hangs up phone and leaves the room. Any additional dialing of the phone 10 at this point will not extinguish the green lamps 19 or illuminate red lamps 18.

Upon re-renting the room the desk clerk or operator at panel 14 operates the clear switch 20 which releases relay D, extinguishes green lamp 19 and reconnects the room phone 10 to the incoming trunk lines 11.

Each room (area unit) has a red and green lamp 18, 19 on each of panels 14, 15 and 16.

Figure 3:
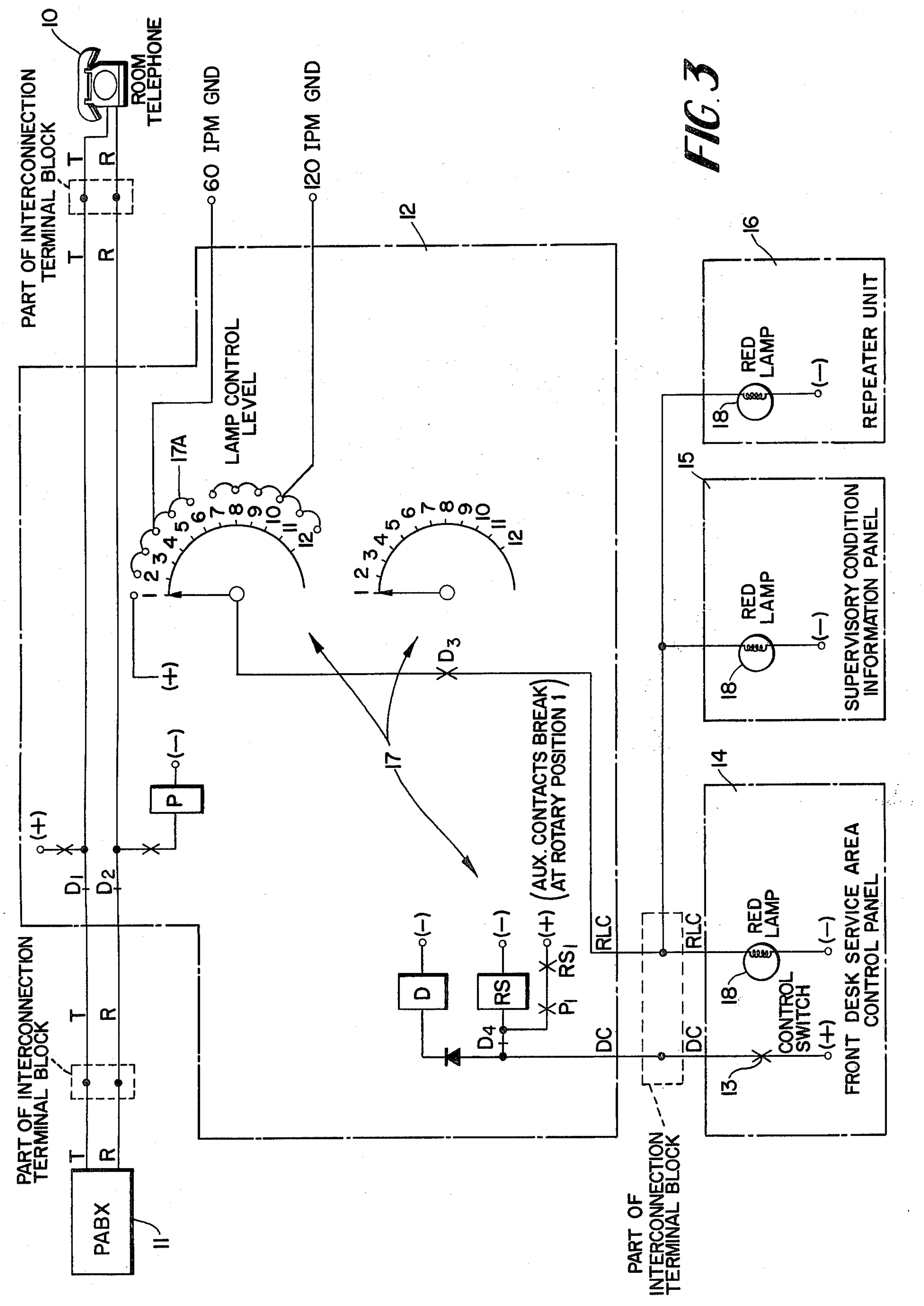
FIG. 3 is a schematic of the block diagram of FIG. 1 illustrating a modified visual display system of the present invention wherein a single lamp capable of operating as a flashing lamp or winking lamp is employed to indicate room status.

Referring now to the visual display modification of FIG. 3, upon a customer checking out at the front desk or service area control means 14, the clerk actuates the disconnect switch 13 which disconnects the telephone 10 from the incoming trunk line 11 through relay D contacts $D_1$ and $D_2$, while simultaneously connecting the telephone 10 into the inhouse circuit through the room (unit) card 12 which is a printed circuit card, one for each room. This simultaneously steps the rotary switch 17 on card 12 one step. All red lamps 18 are now illuminated with 60 IPM or one flash per second indication.

At this point the maid enters the room and takes phone 10 off hook and dials or pulses the number 5 which operates the relay P which steps rotary switch 17 to position 7 which illuminates all red lamps 18 with a 120 IPM or 2 flash per second illumination. The maid then hangs up phone and services the room.

Upon completion of servicing the room the maid then picks up phone 10 and dials 5 which operates relay P and steps rotary switch 17 to position 1 which illuminates all red lights 18 with a steady lamp on condition indicating that the room has been serviced. She then hangs up the phone and leaves the room. Any additional dialing of the phone 10 at this point will not extinguish the steady red lamps 18.

Upon re-renting the room the desk clerk or operator at panel 14 releases the control switch 13 which releases relay D opening contact $D_3$ to extinguish red lamp 18 and reconnects the room phone 10 to the incoming trunk lines 11.

Each area unit has a red lamp 18 on each of panels 14, 15 and 16.

What I claim is:

1. For use with a plurality of dial telephones serving a plurality of service area units, which telephones are connectible to and disconnectible from a PABX with at least one telephone being in each service area unit; an area unit status system comprising:

a. a service area control means comprising a switch and visual status indicating lamps for each of the service area units;
b. at least one remote panel with corresponding status indicating lamps;
c. dial responsive means connected for actuation by dial pulses from said telephones when the telephones are disconnected from said PABX, and also actuated upon energization via said switch;
d. means for disconnecting the telephones from the PABX and energizing the dial responsive means;
e. said means for disconnecting being in circuit with and operated under control of said switch in a first position;
f. lamp operating means comprising a single level stepping switch connected between said lamps and sources of energy therefor and selectively responsive to energization of the dial responsive means to establish a first lamp indicating condition among said lamps, and selectively responsive to the dialing of a first digit to establish a second lamp indicating condition among said lamps, and selectively responsive to the dialing of a second digit to establish a third lamp indicating condition among said lamps; one of said conditions comprising flashing said lamps and a second of said conditions comprising winking said lamps at a rate detectably different from the flashing by human vision, and
g. said means for disconnecting being operated by said switch in a second position to connect the telephones to said PABX and de-energize the dial responsive means.

2. For use with a plurality of dial telephones serving a plurality of service area units, which telephones are connectible to and disconnectible from a PABX with at least one telephone being in each service area unit, an area unit status system comprising:

a. a service area panel and a remote signal panel each having corresponding visual status indicating lamps for the service area units;
b. a first switch actuating circuit comprising a disconnect switch and switch means for disconnecting an associated telephone from the said PABX;
c. a second switching circuit comprising a single level stepping switch, sources of lamp operating energy and selective lamp operating means capable of establishing three different lamp indicating conditions among said lamps; one of said conditions flashing said lamps and a second of said conditions winking said lamps at a rate detectably different from the flashing by human vision, and
d. a third circuit comprising dial response means responsive to operation of the disconnect switch to operate the stepping switch lamp operating means to establish a first condition among said lamps, and further responsive to dialed digits to operate the lamp operating means to establish further indicating conditions among said lamps.

* * * * *